Oct. 27, 1931.    F. H. OWENS    1,829,235

SLIT FORMING DEVICE FOR PHOTOGRAPHIC SOUND APPARATUS

Filed Nov. 26, 1929

INVENTOR.
FREEMAN H. OWENS.
BY Philip S. Hopkins
ATTORNEY.

Patented Oct. 27, 1931

1,829,235

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

SLIT-FORMING DEVICE FOR PHOTOGRAPHIC SOUND APPARATUS

Application filed November 26, 1929. Serial No. 409,868.

This invention relates to improvements in slit forming devices for photographic sound apparatus, the principal object of the invention being to provide a device of this character which is peculiarly adapted for use in connection with dual sound recording and reproducing apparatus, and which device is simple in construction and very efficient in operation.

Other objects and advantages of the invention will appear as the description proceeds.

In the drawings accompanying this specification,

Figure 1:
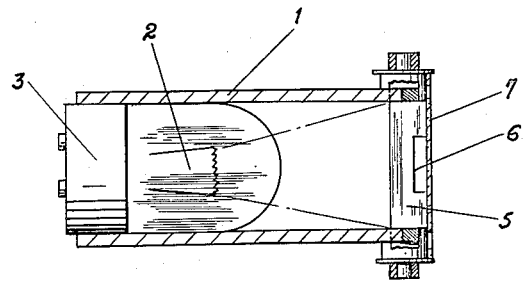
Figure 1 is a longitudinal sectional view through a device embodying the features of the present invention.
Figure 2:
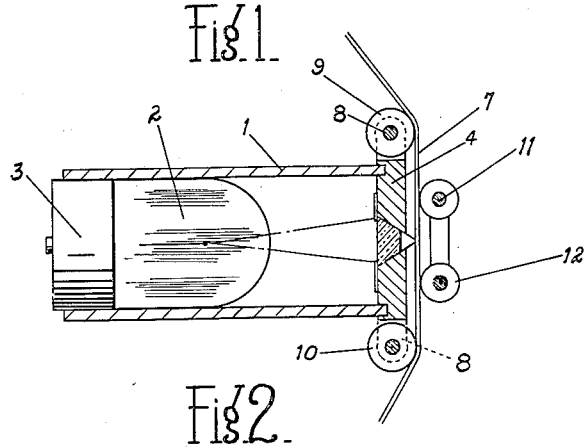
Figure 2 is a longitudinal sectional view taken at right angles to Figure 1.
Figure 3:
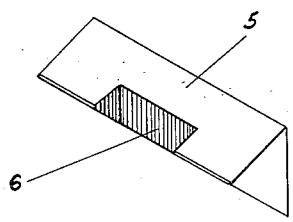
Figure 3 is a perspective view of a prism constituting a feature of the invention.
Figure 4:
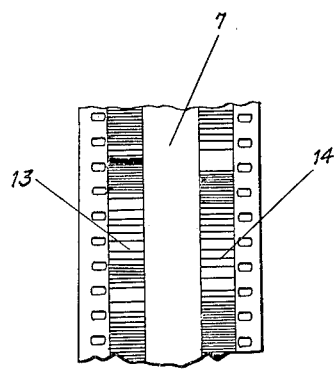
Figure 4 is a plan view of a portion of a film illustrating the sound tracks produced thereon by the device of the present invention.

Referring to the drawings, 1 designates an open-ended housing within which is mounted a recording lamp 2, the base 3 of which forms a suitable closure for one end of said housing. The opposite end of the housing is normally closed by a removable member 4 provided with a transverse opening extending centrally across said member, the side walls of which opening converge toward the outer side of the closure member 4, and in which opening is mounted a glass prism 5 of approximately triangular shape in cross section. The thickness of the closure member 4 as compared with the triangular height of the prism is such that when the latter is mounted in said member with the base of the triangle flush with one side of the closure member 4 the apex of the triangular prism opposite said base will project beyond the plane of the opposite side of said closure member, as clearly shown in Figure 2. The said apex is cut away centrally of the length of the prism thereby to divide said prism into two triangular end portions connected by a trapezoidal central portion, as shown in Figure 3, the trapezoidal portion having a vertical wall or face 6 disposed in a plane to the rear of the apices of said triangular end portions. The said wall may be, and preferably is, painted or otherwise treated to render the same opaque thereby to prevent the passage of light therethrough, while the extreme edge of the apex of each end portion is ground off or truncated slightly to provide an optical slit through which light may pass from the lamp 2 to a film 7 suitably guided past and in contact with the said truncated apices of the end portions.

The closure member 4 is provided at diametrically opposite sides of the housing with bearing brackets 8 in which are mounted for rotation a pair of film supporting rollers 9 and 10, the diameter of each of which is such, and the bearing so located, that the perimeter of the roller will rotate through the vertical plane in which lie the truncated apices of the end portions of the prism. The film as it passes over the rollers will thus pass in contact with both of the said end portions. If desired, a pair of rollers 11 and 12 may be provided for engaging the side of the film opposite from the prism, said rollers being disposed at opposite sides of the prism and between it and the respective supporting rollers 9 and 10, thereby to maintain the film in flat contact with the apices of the slit forming prism.

It is believed that the operation of the device will be clear from the foregoing, taken in connection with the drawings. With the film passing over the rollers 9, 10 and in contact with the projecting end portions of the prism, sound modulated light from the lamp 2 will pass through the slits formed by the truncated apices of the end portions of the prisms and will produce on the film a pair of sound record tracks 13 and 14 in parallel spaced relation.

It will of course be understood that, while the invention is described herein in connection with a recording device, it is equally applicable for use in a reproducing apparatus, in which case a reproducing lamp and its accompanying optical system would be used, together with a film having dual sound record tracks disposed in alignment with the slit forming end portions of the prism.

I claim:

1. In a photographic sound apparatus, a slit forming member comprising a transparent prism having a base and an apex opposite said base, and means for preventing passage of light through said prism from the base to said apex at a central predetermined portion of the length of said prism.

2. In a photographic sound apparatus, a slit forming member comprising a transparent prism having a base and an apex opposite said base, said apex being cut away at a central predetermined portion of the length of said prism thereby to form a surface parallel with the base and said surface being covered with an opaque material.

3. In a photographic sound apparatus, a slit forming member comprising a transparent prism of triangular form in cross section, a portion of one of the apices of the triangle being cut away thereby to form a surface parallel with the base, said surface being covered with an opaque material.

4. In a photographic sound apparatus, a slit forming member comprising a transparent prism of triangular form in cross section, said prism being cut away at the central portion of one of its apices thereby to form a pair of triangular end portions connected by a central portion of trapezoidal form and having a surface parallel with its base, said surface being covered with an opaque material.

5. In a photographic sound apparatus, the combination of an open ended housing, a lamp disposed in said housing and closing one end thereof, a removable closure for the other end of the housing, said closure being provided with an opening therethrough extending transversely of the housing, a transparent prism mounted in said opening and having a base disposed in parallel relation to said closure and an apex extending beyond the outer surface of the closure, a predetermined portion of said apex being cut away to form a surface parallel with said base, said surface being covered with an opaque material.

6. In a photographic sound apparatus, the combination of an open ended housing, a lamp disposed in said housing and closing one end thereof, a removable closure for the other end of the housing, said closure being provided with an opening therethrough extending transversely of the housing, a transparent prism of triangular form in cross section mounted in said opening and having one of its bases flush with the side of the closure nearest said lamp, the apex opposite said base extending beyond the opposite side of the closure, said apex being cut away at the central portion thereof thereby to form a pair of triangular end portions connected by a trapezoidal portion having a surface parallel with said base, said surface being covered with an opaque material.

7. In a photographic sound apparatus, the combination of a transparent prism having a base and an apex opposite said base, a source of light disposed in position to project rays of light through said prism from said base to said apex, means for preventing the passage of light at a central predetermined portion of the prism and means for supporting a traveling film in engagement with said apex.

8. An optical slit for photographic sound recording and reproducing apparatus comprising an elongated prism, one apex of which permits the passage of light therethrough at a plurality of spaced portions thereof, and means on said prism preventing the passage of light through the areas between said spaced portions.

9. In combination, a light, a prism, one apex of said prism permitting the passage of rays from said light therethrough to a traveling film passing said apex, and means on said prism for dividing the light passing therethrough into a plurality of spaced beams.

In testimony whereof, I affix my signature.

FREEMAN H. OWENS.